United States Patent [19]
Kim et al.

[11] Patent Number: 6,043,493
[45] Date of Patent: Mar. 28, 2000

[54] INFRARED SENSOR AND METHOD FOR COMPENSATING TEMPERATURE THEREOF

[75] Inventors: In Sik Kim; Tae Yoon Kim; Young Cho Shim, all of Kyungki-do; Jun Bae Lee, Seoul, all of Rep. of Korea

[73] Assignee: LG Electronics Inc., Seoul, Rep. of Korea

[21] Appl. No.: 09/010,513

[22] Filed: Jan. 21, 1998

[30] Foreign Application Priority Data

Mar. 14, 1997 [KR] Rep. of Korea .................. 97-8821

[51] Int. Cl.[7] ................................ G01J 5/06; G01J 5/08
[52] U.S. Cl. .................... 250/349; 250/353; 250/338.1
[58] Field of Search ............... 250/338.1, 338.4, 250/338.3, 349, 353; 374/121, 133, 130, 129

[56] References Cited

U.S. PATENT DOCUMENTS

| | | | |
|---|---|---|---|
| 4,063,095 | 12/1977 | Wieder | 250/338.1 |
| 4,722,612 | 2/1988 | Junkert et al. | 374/124 |
| 4,772,790 | 9/1988 | Aldridge | 250/343 |
| 4,831,258 | 5/1989 | Paulk et al. | 250/349 |
| 5,397,897 | 3/1995 | Komatsu et al. | 250/338.4 |
| 5,695,283 | 12/1997 | Johnson | 374/133 |

*Primary Examiner*—Constantine Hannaher
*Assistant Examiner*—Albert Gagliardi
*Attorney, Agent, or Firm*—Fleshner & Kim

[57] ABSTRACT

Infrared sensor that can make a temperature compensation by itself, and method for compensating a temperature thereof, are disclosed. The infrared sensor preferably includes a substrate, a diaphragm formed on the substrate, and a first thermopile sensor formed on a region of the diaphragm for sensing an infrared radiation emitted from a measured object and infrared radiations emitted from regions other than the measured object. A second thermopile sensor is formed on a region of the diaphragm and connected to the first thermopile sensor for sensing the infrared radiations emitted from the regions other than the measured object. A housing protects a front face of the substrate including the first, and second thermopile sensors includes an infrared filter in the housing over the first and second thermopile sensors for transmission of infrared radiations, and a reflector reflects the infrared radiation emitted from the measured object toward the first thermopile sensor. The method for temperature compensation can include the steps of letting an infrared radiation from a measured object be directed to the first thermopile sensor and letting infrared radiations from regions other than the measured object be directed to the first and second thermopile sensors, respectively, sensing the infrared radiations in the first and second thermopile sensors directed thereto, and making a temperature compensation for the infrared radiations from regions other than the measured object using the first and second thermopile sensors to provide a temperature component of the measured object only.

8 Claims, 7 Drawing Sheets

INFRARED SENSOR AND METHOD FOR COMPENSATING TEMPERATURE THEREOF

BACKGROUND OF THE INVENTION

1. Field of the Invention

The present invention relates to an infrared sensor, and more particularly, to an infrared sensor in which a temperature can be compensated; and a method for compensating a temperature thereof.

2. Discussion of the Related Art

In general, measuring a temperature is closely related to our every day life, such as air conditioning and cooking as well as to industries. The temperature measuring is done by contact type or non-contact type sensors, of which used most frequently is the contact type and the non-contact type is used when a contact is not possible. For example, the non-contact type has been used for measuring objects to which a contact can not be easily made, such as rotating objects, moving objects, high temperature objects, and etc. As the non-contact type sensor is expensive and difficult to handle, the contact type sensor has been used widely than the non-contact type sensor. However, currently, the demand for the non-contact type sensors is increasing, particularly for simple and low cost radiation type sensors in comparatively low temperature measurements about 0~300° C. Because these non-contact, radiation type sensors can be formed with a simple circuit and the infrared sensors applied thereto can be obtained at low cost currently, the radiation type sensors are more favorable than the contact type sensors in view of the cost. In the infrared sensor, there are photonic type sensors having the photovoltaic effect or the photoconductive effect applied thereto and thermal type sensors, such as bolometer, pyroelectric sensor and thermopile sensor. The photonic type sensor, which utilizes the electric characteristic change of the sensor caused by electron excitation due to incident radiation, has in general an excellent sensitivity and a fast responsivity within a selected wave band. However, the photonic type sensors have disadvantages in that the process technology has not been fully established, and the sensor costs are high and they should be operated at a temperature below liquid nitrogen for obtaining a desired infrared sensitivity. Therefore, in order to use an infrared sensor for commercial and industrial purposes, a sensor which is reliable and requires no cooling is required.

Currently, research for thermal type sensor which can satisfy such requirements are actively underway. As a result of such research, sensors have been developed which can provide useful information on objects that can not be perceived as a visible image, which can be utilized in fields, such as production examinations, process monitoring and non-contact and non-destructive testings. Of sensor material for these sensors, though the most excellent material is (Hg, Cd)Te, because the process technology has not be matured yet, provision of a homogenous substrate has been a problem. Accordingly, research for thermopile sensors that can solve the above problems while fabricated by a semiconductor process are underway. The thermopile sensor is a sensor for sensing a temperature utilizing the Seebeck effect in which two different materials with one ends in contact and the other ends opened generates a thermoelectric power in proportion to a temperature difference between the contact ends and the opened ends. The thermopile sensor has advantages in that it exhibits a stable responsive characteristic to a DC radiation, responds to a wide range of infrared spectrum, and requires no bias voltage or current. The operation principle of the thermopile sensor is based on the Stefan-Boltzmann's law that "every body radiates an energy proportional to a fourth power of an absolute temperature of the body". That is, $P \propto \epsilon \sigma T^4$, where T is an absolute temperature of the body, P is an energy radiated from the body, and $\epsilon$ is an emissivity. In conclusion, the thermopile sensor detects the energy proportional to $T^4$ for measuring a temperature.

FIG. 1 illustrates energies incident to a background art thermopile sensor. As shown, in the energies incident to the thermopile sensor 1, there are an energy A radiated from a measured object 2, an energy B radiated from bodies around the measured object 2, reflected at the measured object 2 and incident to the thermopile sensor, an energy C radiated from a sensor package 3 at an ambient temperature and incident to the thermopile sensor 1, an energy D by thermal conduction through the sensor package 3, and an energy E radiated from the thermopile sensor 1 itself. Therefore, when an object at a high temperature is measured, the thermopile sensor provides a value proportional to a fourth power of the temperature T of the measured object according to the equation $P \propto \epsilon \sigma T^4$ presented above. However, when an object at a low temperature is measured, the thermopile sensor does not provide a value proportional to a fourth power of the temperature T of the measured object according to the equation $P \propto \epsilon \sigma T^4$ presented above, because there are, not only the energy A incident to the thermopile sensor from the measured object 2 under the Stefan-Boltzmann's law, but also the energy E radiated from the thermopile sensor 1 itself under the same law. This can be expressed as when $P \propto \sigma(\epsilon T^4 + RTs^4 - To^4)$, where To is a temperature of the thermopile sensor itself, Ts is an ambient temperature around the measured object, and R is a reflectance. That is, in a high temperature range where a temperature T of the measuring object 2 is very higher than a temperature To of the thermopile itself (T>>To), the $To^4$ in the above equation can be neglected to measure the temperature of the measured object 2, in a low temperature range, the $To^4$ can not be neglected and the temperature of the measured object 2 can not be measured accurately. Therefore, in order to compensate for components such as $To^4$, the background art thermopile sensor is provided with a circuit for detecting and compensating for a sensor temperature or placed in a thermostatic chamber to maintain the sensor temperature constant. Currently, the circuitry compensation is widely used.

FIGS. 2 and 3 respectively illustrate block and circuit diagrams each showing the background art thermopile sensor with a temperature compensation.

Referring to FIGS. 2 and 3, the background art thermopile sensor with a temperature compensation is provided with a thermopile sensor 11 for sensing a temperature of a measured object, a sensor amplifying part 12 for amplifying a signal from the thermopile sensor 11, a temperature compensating element 13 for sensing an ambient temperature around the measured object, a temperature compensating part 14 for amplifying a signal from the temperature compensating element 13, a summing amplifier 15 for summing signals from the sensor amplifying part 12 and the temperature compensating part 14, and a constant voltage source 16 for applying power to the sensor amplifying part 12, the temperature compensating part 14 and the summing amplifier 15. The temperature compensating element 13 is formed with a thermistor or a diode. Thus, by compensating an ambient temperature around the measured objects, a temperature of a desired measured object could be measured.

However, the background art thermopile sensor with a temperature compensation has the following problems.

First, the circuit for a temperature compensation is complicated and costs high.

Second, the sensitivity should be intentionally lowered for preventing a temperature of an object around the measured object, including the temperature of the measured object, from being sensed when the thermopile sensor has a high sensitivity.

SUMMARY OF THE INVENTION

Accordingly, the present invention is directed to an infrared sensor and a method for compensating a temperature thereof that substantially obviates one or more of the problems due to limitations and disadvantages of the related art.

An object of the present invention is to provide an infrared sensor and a method for compensating a temperature thereof, which has a simple system and decreased costs.

Another object of the present invention is to provide an infrared sensor and a method for compensating a temperature thereof, which can solve the intentionally lowered sensitivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the infrared sensor includes a substrate, a diaphragm formed on the substrate, a first thermopile sensor formed on a region of the diaphragm for sensing an infrared radiation emitted from a measured object and infrared radiations emitted from regions other than the measured object, a second thermopile sensor formed on a region of the diaphragm and connected to the first thermopile sensor for sensing the infrared radiations emitted from the regions other than the measured object, a housing for protecting a front face of the substrate including the first, and second thermopile sensors, an infrared filter in the housing over the first, and second thermopile sensors for transmission of infrared radiations, and a reflector for reflecting the infrared radiation emitted from the measured object toward the first thermopile sensor.

The infrared sensor has the first and second thermopile sensors connected to each other of the same polarities in series.

The infrared sensor has the first and second thermopile sensors symmetrically formed.

In the other aspect of the present invention, there is provided a method for compensating a temperature of an infrared sensor, including the steps of letting an infrared radiation from a measured object be directed to the first thermopile sensor and letting infrared radiations from regions other than the measured object be directed to the first and second thermopile sensors, respectively sensing the infrared radiations in the first and second thermopile sensors directed thereto, and making a temperature compensation for the infrared radiations from regions other than the measured object by the first and second thermopile sensors themselves, to determine a temperature component of the measured object only.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
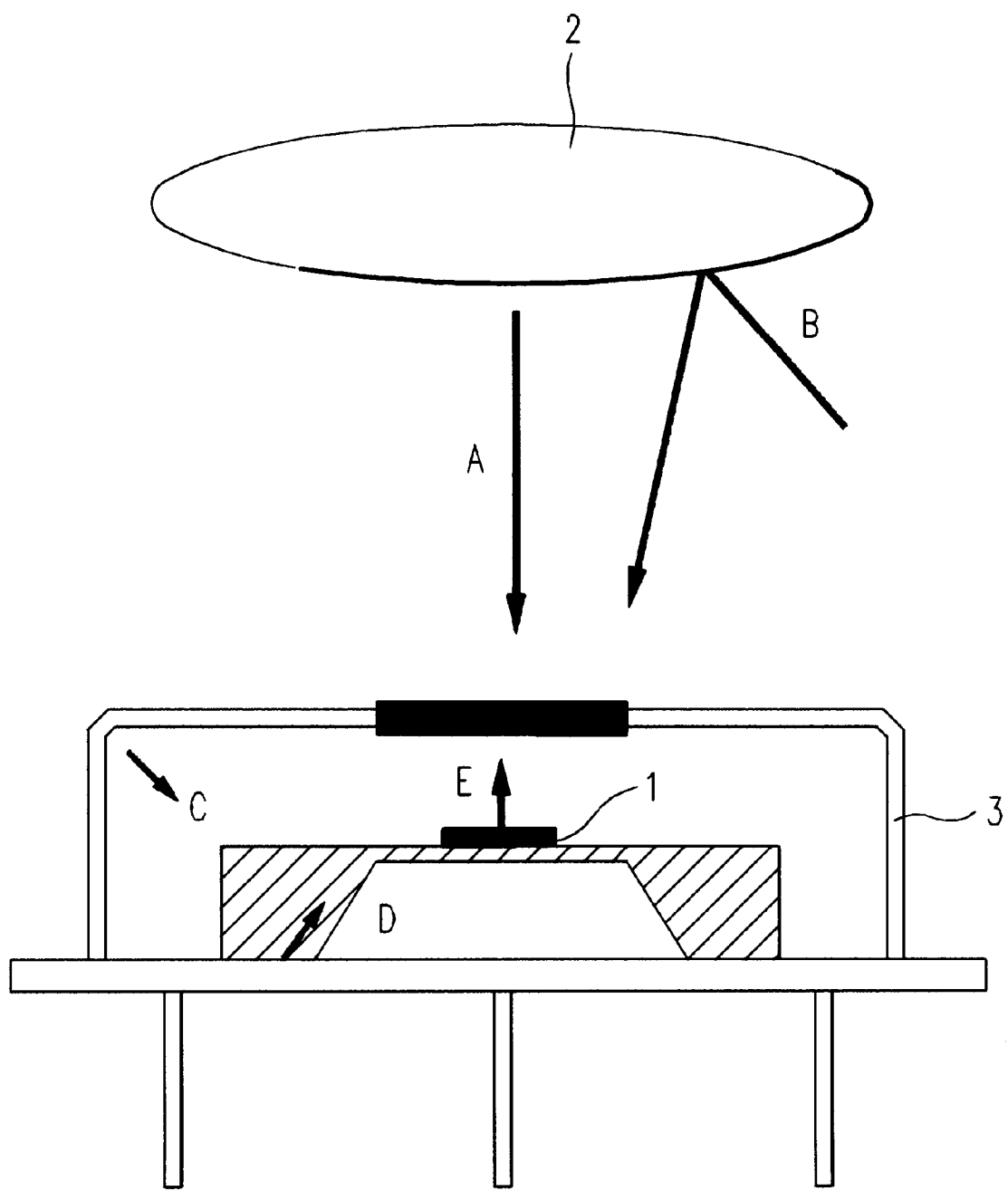
FIG. 1 illustrates energies incident to a background art thermopile sensor.
Figure 2:
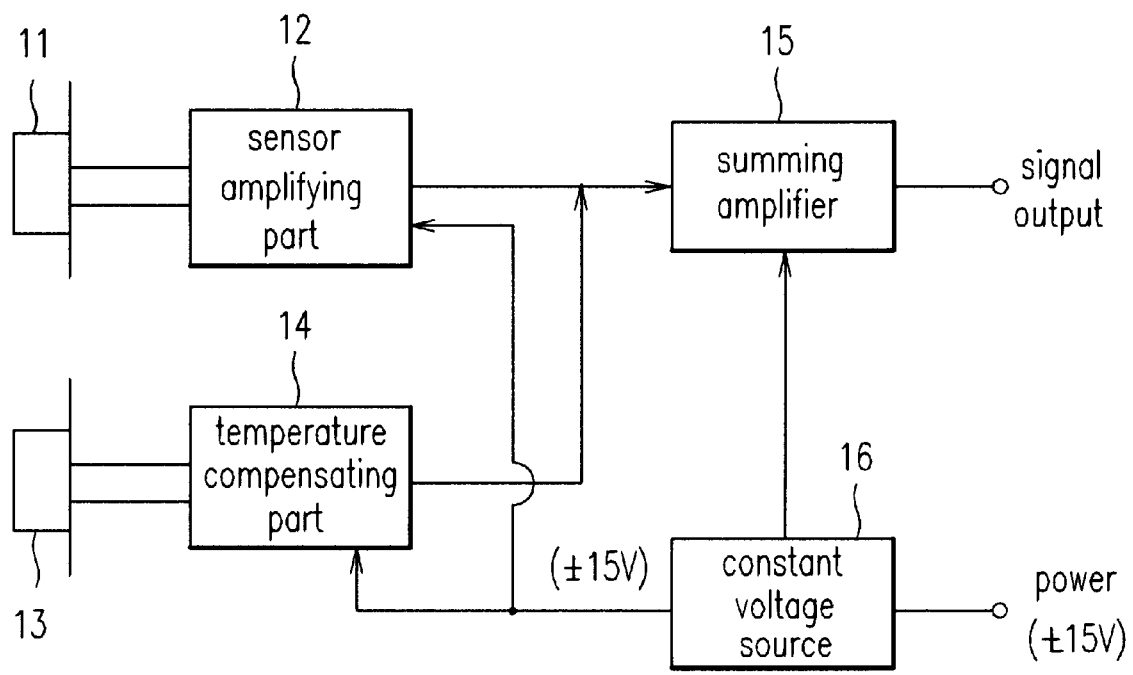
FIG. 2 illustrates a block diagram showing the background art thermopile sensor with a temperature compensation.
Figure 3:
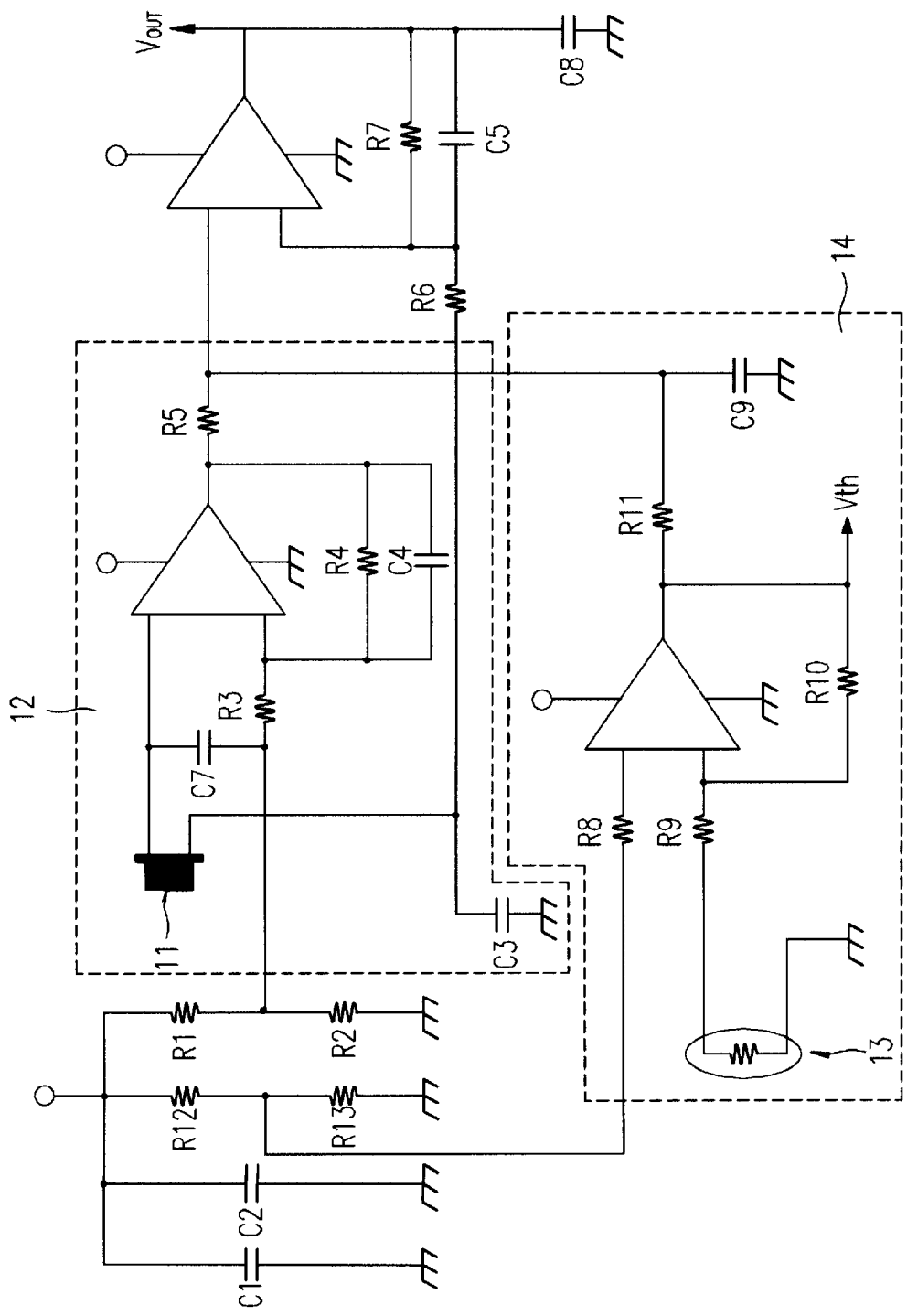
FIG. 3 illustrates a circuit diagram showing the background art thermopile sensor with a temperature compensation.
Figure 4:
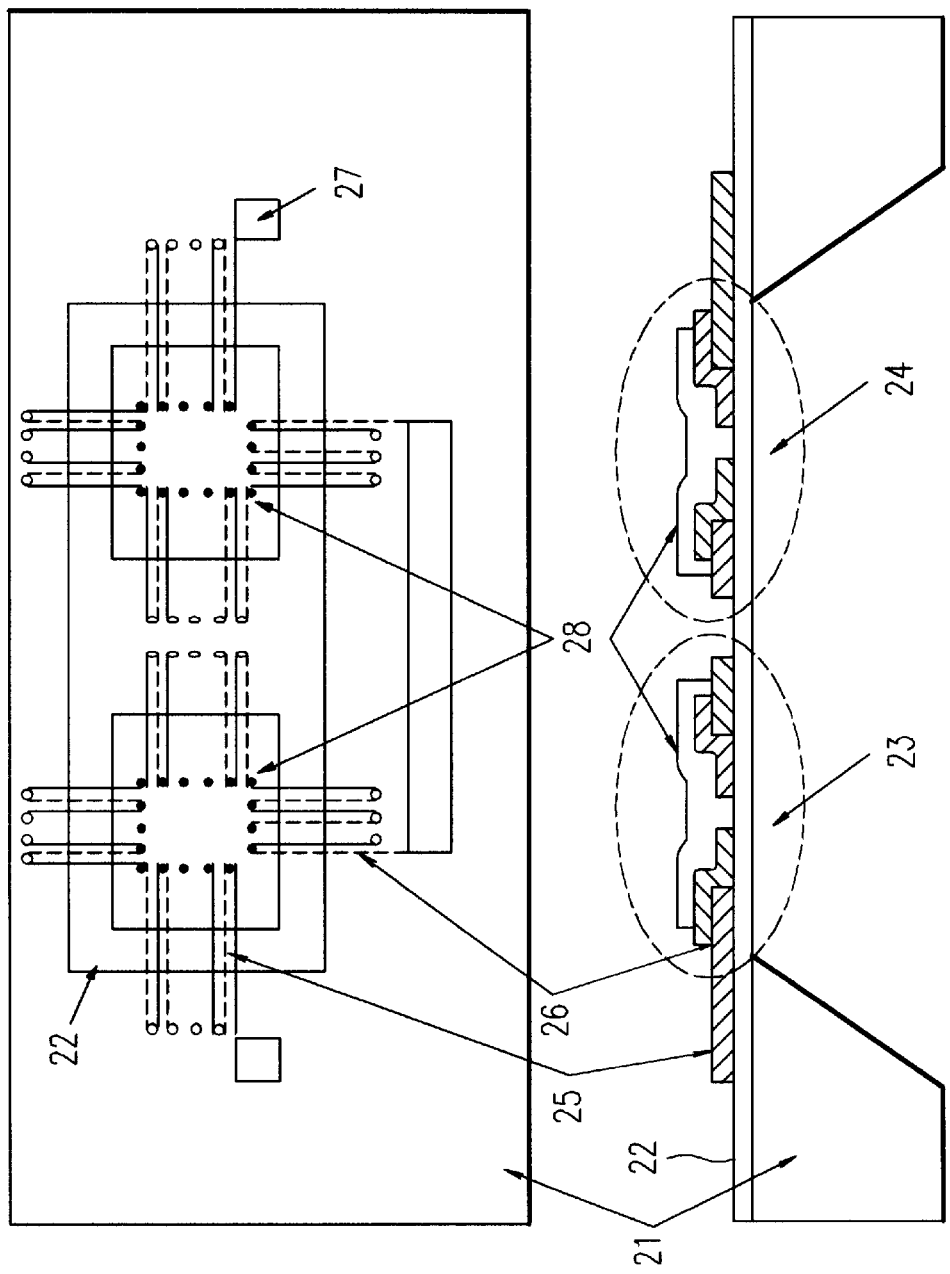
FIG. 4 illustrates plane and sectional views each showing a structure of an infrared sensor in accordance with a preferred embodiment of the present invention.

Reference will now be made in detail to the preferred embodiments of the present invention, examples of which are illustrated in the accompanying drawings. FIG. 4 illustrates plane and sectional views each showing a structure of an infrared sensor in accordance with a preferred embodiment of the present invention.

Referring to FIG. 4, the infrared sensor includes a diaphragm 22 on a region of a silicon substrate 21, a thermopile sensor 23 for measuring an infrared radiation and a thermopile sensor 24 for compensating a temperature. The thermopile sensors 23, 24 are preferably symmetrically formed on the diaphragm 22. Each of the thermopile sensor 23 for measuring an infrared radiation and the thermopile sensor 24 for compensating a temperature includes a thermocouple having a first thermocouple material 25 and a second thermocouple material 26 connected in series on the substrate 21 and the diaphragm 22, a pad 27 on the substrate 21 connected to the thermocouple, and a black body 28 on the diaphragm 22, which is junction of the first thermocouple material 25 and the second thermocouple material 26, for absorbing an infrared radiation. The first, and second thermocouple materials 25 and 26 are formed of different materials of great thermo-electric powers of opposite polarities. And, the thermopile sensor 23 for measuring an infrared radiation and the thermopile sensor 24 for compensating a temperature are connected in series opposition. That is, either the first thermocouple material 25 of the thermopile sensor 23 for measuring an infrared radiation and the first thermocouple material 25 of the thermopile sensor 23 for compensating a temperature, or the second thermocouple material 26 of the thermopile sensor 23 for measuring an infrared radiation and the second thermocouple material 26 of the thermopile sensor 23 for compensating a temperature are connected together to provide the sensors 23 and 24 with opposite polarities.

Figure 5:
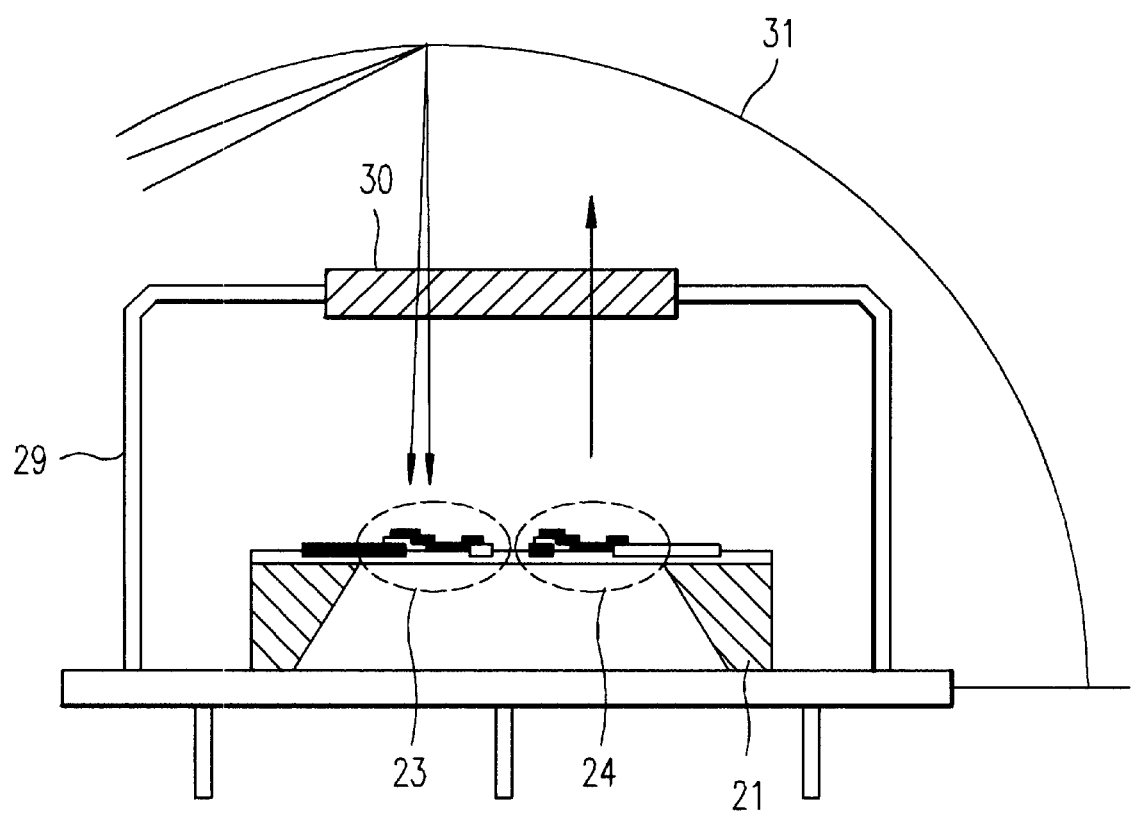
FIG. 5 illustrates a section of an infrared sensor package of the present invention.

FIG. 5 illustrates a section of an infrared sensor package of the present invention.

Referring to FIG. 5, the infrared sensor package includes a housing 29 for protecting a front surface of a substrate 21 having the thermopile sensor 23 for measuring an infrared radiation and the thermopile sensor 24 for compensating a temperature formed symmetrically thereon, an infrared filter 30 in the housing 29 over the thermopile sensor 23 for measuring an infrared radiation and the thermopile sensor 24 for compensating a temperature, and a reflector 31 for reflecting an infrared radiation emitted from a measured object toward the thermopile sensor 23 for measuring an infrared radiation. The infrared filter 30 is also formed over the thermopile sensor 24 for compensating a temperature, for allowing an infrared radiation emitted from the thermopile sensor 24 for compensating a temperature itself to escape out of the housing.

Operations of the aforementioned preferred embodiment of an infrared sensor of the present invention will be explained.

The infrared radiation emitted from the measured object is adapted to be reflected at the reflector 31 only toward the thermopile sensor 23 for measuring an infrared radiation. The infrared radiations emitted from regions other than the measured object (e.g. energies emitted by temperatures around the measured object and heat conduction through the package) are adapted to be directed both to the thermopile sensor 23 for measuring an infrared radiation and the thermopile sensor 24 for compensating a temperature. Thus, the sensors 23 and 24 sense incident infrared radiations respectively, to compensate for the infrared radiations emitted from regions other than the measured object by themselves, only to provide a temperature component of the measuring object. That is, because the two sensors 23 and 24 are connected in series opposition, a value from the thermopile sensor 24 for compensating a temperature is subtracted from a value from the thermopile sensor 23 for measuring an infrared radiation, so that only the temperature component of the measured object is output.

Figure 6:
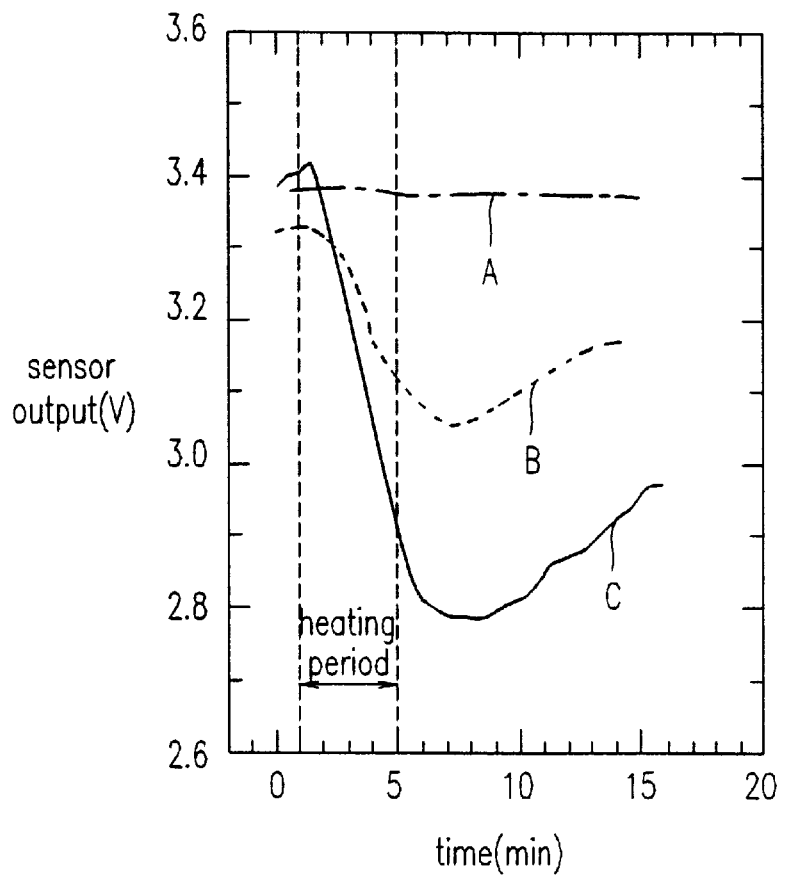
FIG. 6 illustrates a graph showing a comparison of infrared sensors of the present invention and the background art.

FIG. 6 illustrates a graph showing a comparison of infrared sensors of the present invention and the background art, wherein "A" is a graph showing outputs of the infrared sensor of the present invention, and "B" and "C" are graphs each showing outputs of the background art infrared sensor. "B" denotes a case of sensor with a low sensitivity and "C" denotes a case of a sensor with a high sensitivity.

Referring to FIG. 6, it can be known that "A" shows an output characteristic of which temperature compensation is perfect or increased regardless of the temperature change occurred in regions other than the measured object in comparison to "B" and "C".

Figure 7:
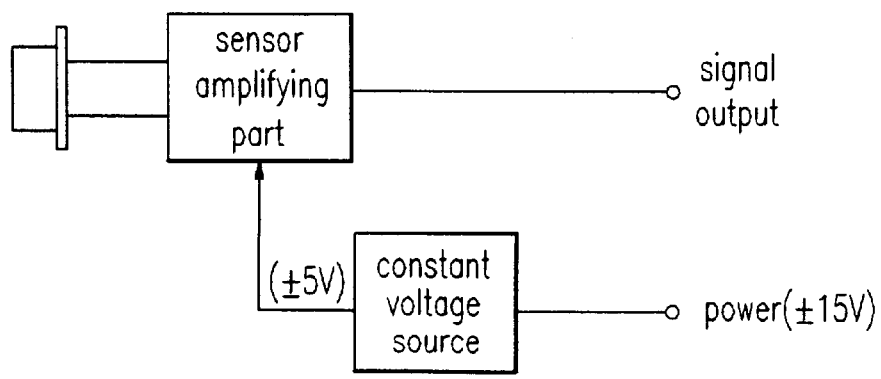
FIG. 7 illustrates a block diagram showing an infrared sensor in accordance with a preferred embodiment of the present invention; and, FIG. 8 illustrates a circuit diagram showing an infrared sensor in accordance with a preferred embodiment of the present invention.
Figure 8:
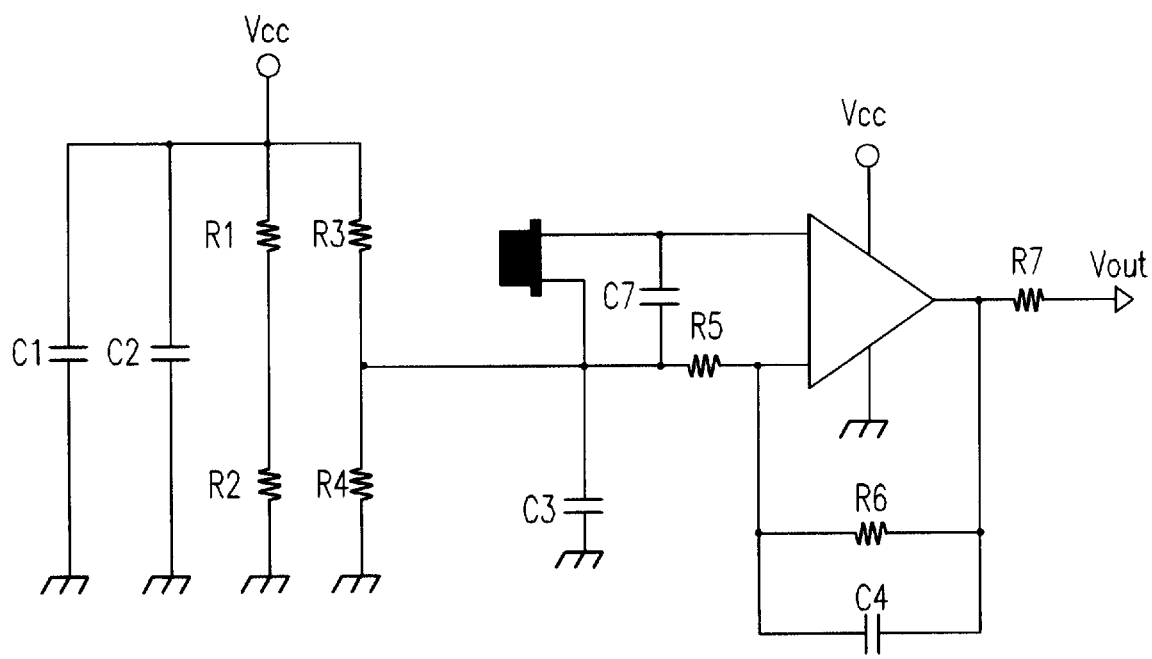

FIGS. 7 and 8 respectively illustrate block and circuit diagrams each showing an infrared sensor in accordance with a preferred embodiment of the present invention, wherefrom it can be known that, in comparison to the background art infrared sensor, the infrared sensor includes a sensor amplifying part and a constant voltage source only without requiring the temperature compensating part and the summing amplifier of the background art.

The infrared sensor and the method for compensating a temperature thereof according to the preferred embodiments of the present invention has the following advantages.

First, because the temperature compensation by the infrared sensor itself allows not to require any additional temperature compensation circuit or a summing amplifier circuit, the circuit is simplified and cost can be lowered.

Second, the formation of the infrared radiation measuring sensor and the temperature compensating sensor on the same chip allows the infrared sensor of the present invention to maintain a high output voltage with an excellent compensation performance and to solve the background art problem of sensor sensitivity drop.

It will be apparent to those skilled in the art that various modifications and variations can be made in the infrared sensor and the method for compensating a temperature thereof of the present invention without departing from the spirit or scope of the invention. Thus, it is intended that the present invention cover the modifications and variations of this invention provided they come within the scope of the appended claims and their equivalents.

What is claimed is:

1. An infrared sensor, comprising:
   a substrate;
   a diaphragm formed on the substrate;
   a first sensor formed on a region of the diaphragm for sensing an infrared radiation emitted from a measured object and infrared radiations emitted from regions other than the measured object;
   a second sensor formed on a region of the diaphragm and connected to the first sensor for sensing the infrared radiations emitted from the regions other than the measured object; and
   a reflector for reflecting the infrared radiation emitted from the measured object toward only the first sensor, wherein the reflector further reflects radiation emitted by one of the first sensor and the second sensor to both the first and second sensors.

2. An infrared sensor as claimed in claim 1, wherein both the first and second sensors are thermopile sensors.

3. An infrared sensor as claimed in claim 1, wherein the first and second sensors are connected to each other in series opposition.

4. An infrared sensor as claimed in claim 1, wherein the first and second sensors are formed symmetrically.

5. The infrared sensor of claim 1, wherein the infrared radiations emitted from the regions other than the measured object include radiation emitted by the first and second sensors.

6. The infrared sensor of claim 1, wherein the reflector is adapted to reflect the infrared emissions emitted from regions other than the measured object to the first and second sensors.

7. An infrared sensor, comprising:
   a substrate;
   a diaphragm formed on the substrate;
   a first sensor formed on a region of the diaphragm for sensing an infrared radiation emitted from a measured object and infrared radiations emitted from regions other than the measured object;
   a second sensor formed on a region of the diaphragm and connected to the first sensor for sensing the infrared radiations emitted from the regions other than the measured object; and
   a reflector for reflecting the infrared radiation emitted from the measured object toward only the first sensor, wherein the reflector further reflects radiation emitted by the first sensor to the first and second sensors.

8. An infrared sensor, comprising:
   a substrate;

a diaphragm formed on the substrate;

a first sensor formed on a region of the diaphragm for sensing an infrared radiation emitted from a measured object and infrared radiations emitted from regions other than the measured object;

a second sensor formed on a region of the diaphragm and connected to the first sensor for sensing the infrared radiations emitted from the regions other than the measured object; and a reflector for reflecting the infrared radiation emitted from the measured object toward only the first sensor, wherein the reflector further reflects radiation emitted by the second sensor to the first and second sensors.

* * * * *